United States Patent

[11] 3,538,948

| [72] | Inventors | Norman A. Nelson and<br>Jerry B. Tomlin, Houston, Texas |
|---|---|---|
| [21] | Appl. No. | 775,090 |
| [22] | Filed | Nov. 12, 1968 |
| [45] | Patented | Nov. 10, 1970 |
| [73] | Assignee | ACF Industries Incorporated<br>New York, New York<br>a corporation of New Jersey |

[54] GATE VALVE HAVING GATE POSITION INDICATING MEANS
12 Claims, 6 Drawing Figs.

[52] U.S. Cl.................................................. 137/554,
333/206, 207; 340/282
[51] Int. Cl.................................................F16k 37/00,
G08b 21/00
[50] Field of Search........................................ 340/282,
196; 137/553, 554; 200/(ask), 84.3; 333/207

[56] References Cited
UNITED STATES PATENTS

| 3,378,224 | 4/1968 | Boyle | 251/63.6X |
| 3,412,391 | 11/1968 | Ward | 340/282 |
| 2,802,483 | 8/1957 | Davis | 137/553 |

Primary Examiner—Henry T. Klinksiek
Attorney—James L. Jackson

ABSTRACT: A gate valve having position indicator mechanism which includes magnetically actuated switches which are actuated by permanent magnets either carried by the gate to cause the transmission of an electrical signal to a remotely located monitoring facility to positively indicate the position of the gate. As the gate moves to the proper open or closed position, one of the switches will be actuated by the magnetic field of the permanent magnet or magnets and will close an electric circuit thereby relaying a signal to a remotely located monitoring facility so that the precise position of the gate can be positively ascertained at all times.

Patented Nov. 10, 1970

Norman A. Nelson
Jerry B. Tomlin
INVENTORS

BY
*James D. Jackson*
ATTORNEY

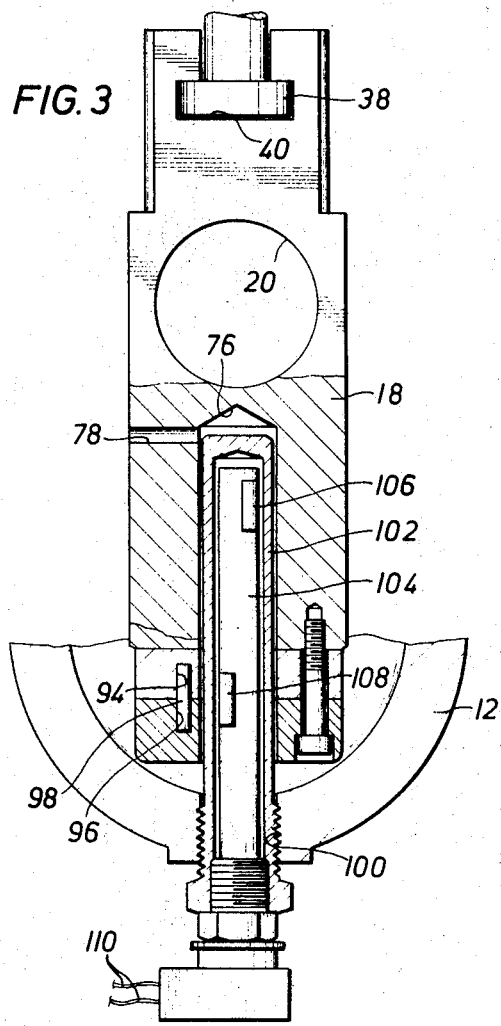
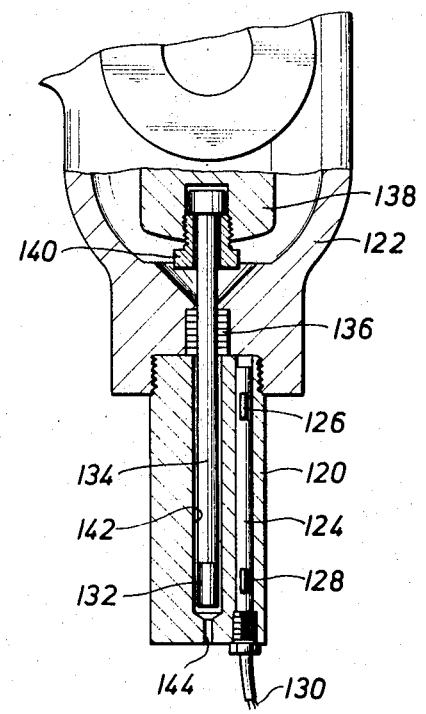
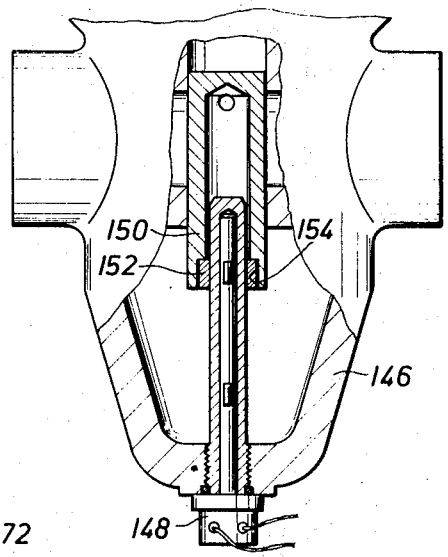
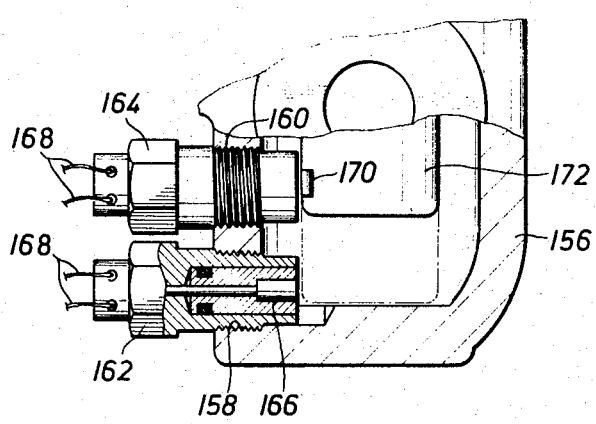
Norman A. Nelson
Jerry B. Tomlin
INVENTORS

GATE VALVE HAVING GATE POSITION INDICATING MEANS

BACKGROUND OF THE DISCLOSURE

This invention relates generally to valves and more particularly to gate valves which may or may not be positioned in a submerged operating condition and which gate valves may be controlled by a remotely energized valve actuator for inducing controlling movement to the gate of the valve. Such valve and valve operator mechanisms are frequently utilized in service conditions where the valve is physically located remotely from the control and monitoring facility such as, for example, when wellhead valves are positioned on the ocean floor and are controlled from a platform or from a shore-based control facility. When such valves are utilized on remotely located wellheads, it is necessary to know the precise position of each of the various valves on the wellhead to assure proper control thereof. In the event an erroneous signal is sent to the control and monitoring facility falsely indicating the position of a wellhead valve, it is possible to cause severe damage to or even destruction of the wellhead in which the valve is situated. Such an erroneous signal can be sent to the control and monitoring facility if the signal is responsive to movement of controlling hydraulic fluid or is responsive to physical movement of the valve stem or hydraulic operator parts. It is possible that the gate structure may become disconnected from the valve stem or that some other malfunction may take place within the valve operator resulting in an erroneous signal being sent to the monitoring facility.

Most valve and valve operator signal indicator mechanisms rely upon movement of hydraulic fluid or upon mechanical or hydraulically energized position indicator mechanisms which are related to the valve operator system rather than relating the position signal specifically to the position of the gate member of the valve. In general, the results produced by signal indicator systems of this nature are adequate, but such systems do not prevent an erroneous position signal from being sent to the monitoring facility in the event that the gate becomes disconnected from the valve stem, for example.

It has not been considered commercially feasible heretofore to locate position indicator mechanisms within the valve chamber of most valves since these mechanisms will be in contact with the production fluid controlled by the valve and, therefore, will be required to function in a corrosive environment and to withstand the damaging effects of various contaminants. Moreover, such position indicator mechanisms will be subjected to severe fluid pressures within the valve chamber. The production fluid controlled by the valve, for example, might be petroleum or petroleum gas laden with hydrogen sulfide, saltwater, and various other corrosive elements which would render most otherwise unprotected position indicator mechanisms inoperative in a short time.

Accordingly, it is a primary object of this invention to provide a novel valve mechanism including a position indicator which is effective to transmit an electrical position signal to a remotely located control and monitoring facility responsive only to the physical position of the gate or other valve element of the valve.

It is a further object of this invention to provide a novel valve mechanism having a position indicator which is at least partially located within the valve chamber and which effectively withstands the corrosive effects of production fluid and the damaging effects of fluid pressure.

Among the several objects of this invention is contemplated the provision of a novel valve mechanism which unitizes electrical circuitry for generating a position indicating signal and which circuitry is magnetically energized.

It is an even further object of this invention to provide a novel valve mechanism including signal indicating structure which is simple in nature, reliable in use and low in cost.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawings in which:

FIG. 3 is a fragmentary sectional view of the valve of FIG. 3 illustrating cooperation between the gate assembly and the magnetically actuatable switch and electrical circuitry thereof in detail.

FIG. 4 is a fragmentary partial sectional view of the lower portion of a gate valve illustrating a modified embodiment of this invention.

FIG. 5 is a fragmentary partial sectional view of a gate valve illustrating a further modified embodiment of this invention.

FIG. 6 is a fragmentary elevational view of a gate valve having portions thereof broken away and showing a further modified embodiment of this invention in section.

Figures 1, 2:
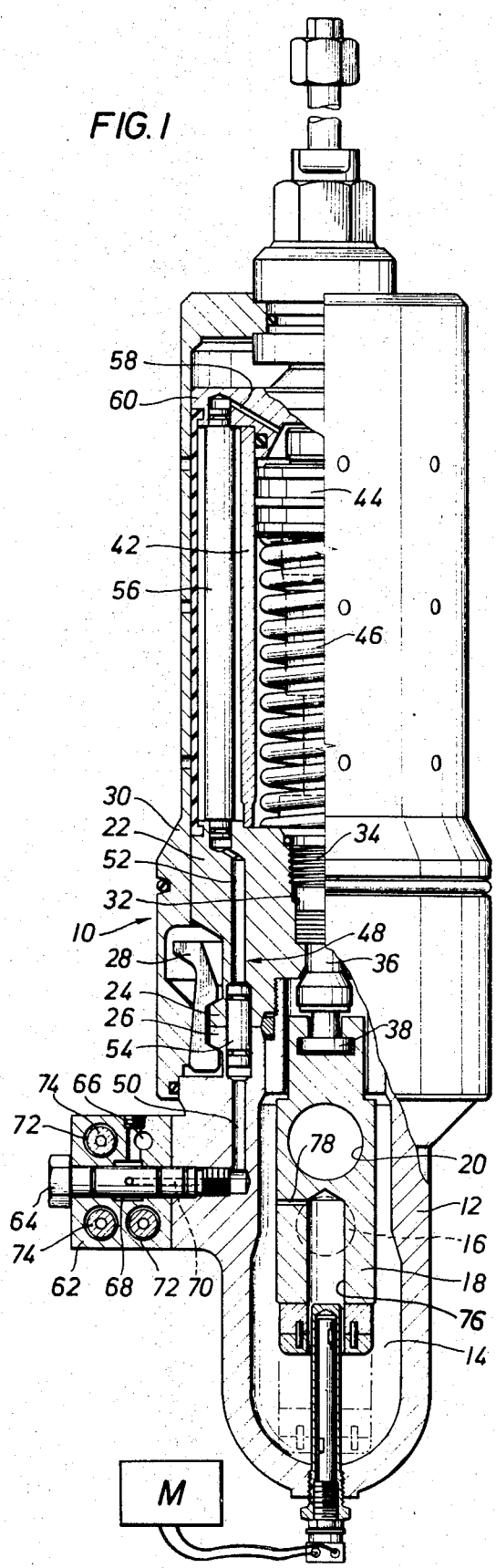
FIG. 1 is an elevational view of a valve and valve operator assembly incorporating this invention and having portions thereof cut away and shown in section.
FIG. 2 is an isometric exploded view of the gate mechanism of the valve of FIG. 1 illustrating the magnet carrier assembly thereof in detail.

Briefly, this invention relates to a valve mechanism which includes permanent magnets carried by the valve element which magnets are capable of actuating reed switches upon movement of the valve element between the open and closed positions of the valve element. While this application is generally related to application of the invention to gate valves, it is not intended that this invention be limited to this particular type of valve. It is necessary only that the particular type of valve be capable of actuating reed switches upon movement of the valve element thereof for the purpose of energizing electrical signal circuitry to positively indicate the position of the valve element. As set forth in this disclosure, the gate member, as it is moved to its open or closed position, will transport permanent magnets into close proximity with one of the closely adjacent reed switches thereby causing the reed switch to be actuated by the magnetic field of the permanent magnet or magnets in such manner as to close the reed switch and complete an electrical circuit. The electrical circuit in turn will transmit position signals to remotely located monitoring and control facility. In the event the hydraulic actuating mechanism or the valve stem structure of the valve is subjected to damage or in the event of other malfunction which prevents proper positioning of the gate member, an erroneous signal will not be sent to the monitoring signal because the position signal is responsive only to the precise position of the gate element.

With reference now to the drawings for a more detailed description of this invention, in FIG. 1 a gate valve and valve operator assembly is illustrated generally at 10 which includes a valve body 12 defining a valve chamber 14. A production of flow passage 16 shown in dash lines in FIG. 1 extends through the valve body in fluid communication with the valve chamber. The flow of production fluid through the valve is controlled by a gate member 18 which is provided with a port 20 for a registry with the flow passage 16 in the open position of the valve. The gate member 18 is illustrated in the closed position thereof in FIG. 1.

The valve operator section of the valve and operator assembly 10 includes an operator body 22 having a lower connection flange 24 which is adapted for abutting sealed engagement with an upper connection flange 26 formed on the valve body 12. A plurality of segment clamps 28 are disposed about the flanges 24 and 26 and are movable between latched and unlatched positions thereof by the internal cam surfaces of a shroud member 30 for the purpose of releasably connecting the connector flanges 24 and 26 into abutting sealed assembly. The shroud member is movable relative to the operator body to achieve latching and unlatching of the segment clamps 28.

The operator body 22 is provided with a central passage 32 having internal threads defining a portion thereof in which is threadedly received a packing assembly 34 for the establishment of the fluid tight seal between the operator body 22 and a valve stem 36 which extends through the central passage. The lowermost portion of the stem 36 is provided with connection structure for establishing operating connection with the uppermost portion of the gate member 18. A head 38 of the valve stem 36 is received within a connection slot 40 formed at the upper extremity of the gate member 18 to connect the valve stem 36 and the gate 18.

The valve operator mechanism is of the linear hydraulic actuation type and includes a hydraulic cylinder 42 in which is disposed a piston 44 adapted for reciprocal movement therein. The upper extremity of the valve stem 36 is physically connected in immovable relation with the piston 44 in such manner that movement of the piston 44 causes corresponding movement to the valve stem 36 and the gate member 18. A compression spring 46 is interposed between the lower portion of the piston 44 and the upper extremity of the operator body 22 and serves to bias the piston outwardly away from the operator body. This feature allows mechanical actuation of the piston 44, the valve stem 36 and the gate 18, to a preselected safe position of the gate 18, either selectively by operator personnel or automatically in the event of failure of the hydraulic power source.

The valve operator has a fluid supply passage system 48 with a part 50 in the valve body 12 and a part in the operator body 22. The passages 50 and 52 are maintained in fluid communication through a connector tube 54 which establishes a sealed bridge between the valve body and operator body when the same are disposed in abutting sealed assembly. Hydraulic fluid from the passage 52 is communicated into a fluid passage defined by a tubular conduit member 56 which connects the operator body passage with a fluid passage 58 formed in the end cap 60 of the hydraulic operator. For energization of the hydraulic operator, hydraulic fluid from the hydraulic fluid supply source is conducted through the valve and operator passage structure and is introduced into the hydraulic cylinder 42 outwardly of the piston 44. Introduction of hydraulic fluid into the cylinder in this manner will actuate the piston inwardly toward the valve body 12 thereby compressing the spring 46 and causing the valve stem 36 and the gate element 18 to be moved to a position aligning the port 20 in the gate 18 with the production flow passage 16 of the valve. To close the valve, it is necessary that the hydraulic fluid supply system be controlled in such a manner as to allow hydraulic fluid to flow freely out of the cylinder 42 and through the hydraulic fluid system 48. When this occurs, the combined effects of the compression spring 46 and the fluid pressure acting on the valve stem 36 through the circular area defined by the valve stem 36 causes the stem and piston constructure to be positively urged outwardly away from the valve body thereby moving the gate member 18 to its closed position and blocking the flow of fluid through the production flow passage 16 of the valve assembly.

For the purpose of supplying hydraulic fluid under pressure to the hydraulic fluid system 48, of the valve and valve operator assembly, a supply module device 62 is connected to the valve body structure 12 by a fluid connection bolt 64. The module 62 is so constructed that a fluid distribution passage 66 thereof, being one of a number of fluid distribution passages extending therethrough, is disposed in fluid communication with an annular enlargement 68 surrounding the bolt 64. Pressurized hydraulic fluid within the annular enlargement is communicated into the hydraulic passage 50 of the valve body through a connection passage 70 illustrated in dash lines in FIG. 1. The remaining passages 72 extending through the module 62 merely serve as guides for hydraulic distribution conduits 74 extending therethrough. These conduits are connected to the hydraulic fluid supply system of other valve and valve operator assemblies of the valves of a wellhead, for example.

Referring now particularly to FIG. 1, the gate member 18 is provided with an internal axial passage 76 and a fluid bleed passage 78. As shown in FIG. 2, a pair of magnet retaining blocks 80 and 82, composed of nonmagnetic metal, such as aluminum, stainless steel or other suitable nonmagnetic material, are retained in assembly with the gate 18 by a pair of bolts 84 which extend through apertures 86 and 88 in the blocks 80 and 82 and are threadedly received within threaded apertures formed in the gate member 18. The blocks 80 and 82 are also provided with central passages 90 and 92 respectively, which are disposed for registry with the axial passage 76 of the gate 18 for the purpose of defining a single elongated passage which is open at the bottom of the block 82 and extends upwardly into the gate 18. A plurality of opposed registering recesses 94 and 96 are formed in the magnet support blocks 80 and 82 respectively, as shown in FIG. 3, to provide encapsulated pockets for a plurality of permanent magnets 98 disposed therein. When the magnet support blocks 80 and 82 are disposed in assembly, the permanent magnets 98 are retained in proper position within the gate for actuation of reed switches in the manner discussed hereinbelow.

As illustrated in detail in FIG. 3, the valve body 12 is provided with a threaded aperture 100 into which is threaded a nonmagnetic reed switch protector sleeve 102. The protector sleeve 102 must be of sufficient strength to withstand the effects of fluid pressure within the valve and to protect a reed switch mechanism from the corrosive effects of the production of fluid controlled by the valve. A magnetic reed switch mechanism 104 is threadedly received at the lower extremity of the protector sleeve 102 and includes upper and lower reed switches 106 and 108 located therein. The reed switch mechanism 104 is provided with electrical circuitry 110 connected to the switches 106 and 108 for the purpose of transmitting electrical signals from the reed switch circuits to a remotely located signal monitoring facility illustrated schematically at M in FIG. 1.

As the gate 18 is actuated upwardly by the hydraulic operator mechanism, the permanent magnets 98 will be moved upwardly relative to the immovable protector sleeve 102. As the permanent magnets 98 leave close proximity with the lower reed switch 108, the reed switch 108 will open, deenergizing the electrical circuit 110 in which it is connected and thereby indicating at the monitoring facility that the gate member 18 has begun to traverse the distance between its open and closed positions. After the gate member 18 has moved upwardly sufficiently to bring the magnetic field of the permanent magnet 98 in close proximity with the upper reed switch 106, the upper reed switch will close, thereby energizing its circuit and transmitting an electrical signal to the remotely located position monitoring facility. As the gate member 18 traverses between its open and closed positions, production fluid which is within the valve chambers and within the gate passage 76 will flow out of the chamber 76 or into the chamber 76 through the bleed passage 78. This feature prevents the buildup of pressure within the passage 76 and prevents the development of a hydrostatic lock condition or partial vacuum within the passage 76 as the gate member is reciprocated.

It is apparent, therefore, that in the event the hydraulic fluid supply system of the operator should malfunction, or in the event the gate member 18 should become disconnected from the valve stem, and accurate indication will be transmitted to the control facility advising that the gate member is in the "open" or "closed" position thereof, or is at some other position between the open or closed positions. Personnel controlling the valve, therefore, will always be aware of the exact condition of valves controlled in this manner and will be capable of preventing damage of the system in which the valve is connected.

With reference now to FIG. 4, a modified embodiment of our invention is illustrated in which a reed switch carrier member 120 is threadedly received at the lower portion of a valve body 122. A reed switch mechanism 124 is threadedly received at the lower extremity of the switch carrier mechanism and includes upper and lower reed switches 126 and 128 which are connected to suitable electrical circuitry 130 for the transmission of electrical signals to a remotely located position monitoring facility. The reed switches 126 and 128 are disposed in close proximity to the travel of a permanent magnet 132 fixed to the lower extremity of a gate extension rod 134, composed of nonmagnetic material. The rod 134 extends through a packing assembly 136 and is connected at its upper extremity with the lower portion of a gate 138 by a retainer 140. The switch carrier body 120 is provided with an axial passage 142 which is communicated to the atmosphere or to the medium in which the valve is submerged through a bleed passage 144. In the event the valve should be submerged in water, the water within the passage 142 may be displaced through the bleed passage 144 as the gate 138 reciprocates the rod 134. The lower magnetically actuated reed switch 128 will normally be closed when the rod is in the position illustrated in FIG. 4, thereby completing its electrical circuit and transmitting an electrical signal to the remotely located position monitoring facility to indicate that the gate 138 is also in its lowermost position. As the gate member 138 moves upwardly, the permanent magnet 132 on the rod 134 will be moved out of proximity with the lower reed switch 128 causing this reed switch to open, deenergizing its electrical circuit and providing a positive indication that the gate member 138 has left its lowermost position. As the permanent magnet 132 is moved into close proximity with the upper reed switch 126, this switch will be closed by the magnetic field thereby energizing its electrical circuit and transmitting a positive signal to the remotely located monitoring facility that the gate member 138 has reached its uppermost operative position.

With reference now to FIG. 5, a modified valve body 146 is illustrated which includes reed switch apparatus and electrical circuitry 148 which is constructed generally identical with the reed switch apparatus illustrated in FIG. 3. The gate member 150, however, is provided with a ring magnet 152 which is received within a recess 154 formed at the lower extremity of the gate member. The permanent ring magnet 152 will effectively control opening and closing of the reed switches as the gate member is reciprocated between its upper positions as illustrated in FIG. 5 and its closed position.

Referring now to FIG. 6, which illustrates a further modified embodiment of this invention, a valve body 156 is provided with two threaded apertures 158 and 160 for threadedly receiving reed switch carrier devices 162 and 164 respectively. Reed switches 166 which are disposed within the reed switch carrier devices 162 and 164 are connected with proper electrical circuitry 168 for transmitting electrical signals to a remotely located position monitoring facility. A permanent magnet 170 carried by the gate mechanism 172, is disposed for travel in close proximity with the reed switches 166 so that the upper reed switch is actuated when the gate is in the upper position thereof and the lower reed switch is actuated when the gate reaches the lowermost position thereof to transmit gate position signals to the remotely located monitoring facility. For example, the switches 106 and 108 in FIG. 3 might be switch mechanisms including open magnetic circuits. The gate 18 will serve as an armature actuating the upper switch mechanism 106 in the upper position of the gate and actuating both the upper and lower switch mechanisms 106 and 108 when the gate is in its lowermost position. As a further example, the reed switch carriers 162 and 164 in FIG. 6 might include magnetically actuated switch mechanisms including magnet devices at 166 which have incomplete magnetic circuitry. The gate 172, which need not carry a magnet 170, upon moving into close proximity.

As a further modification of this invention, the magnetically actuatable switch mechanisms, instead of carrying switches which are actuated by the magnetic field of magnets carried by the gate member, may instead include open magnetic circuits which are operatively connected to suitable electrical switch apparatus. The gate member or any suitable extension of the gate will move into close proximity with the open magnetic circuits and will serve as an armature to complete the magnetic circuit. Upon completion of the magnet circuit the switch apparatus will be actuated, energizing the switch circuits and relaying electrical signals to a remotely located monitoring facility to indicate the position of the gate with the switch mechanisms, will serve as an armature completing individual magnetic circuits or completing a magnetic circuit between the switch carrier mechanisms 162 and 164 and thereby serving to actuate the switch mechanisms responsive to the exact position of the gate.

It is evident from the foregoing that we have provided a novel valve mechanism having a position indicator structure, which is capable of positively indicating whether the gate member is in the open or closed position or at a position between the open and closed positions regardless of the particular position or condition of the hydraulic operator power mechanism or the position of the valve stem of the valve. In the event the valve stem should become disconnected from the gate member such as by breakage of the valve stem, the gate member will remain in a safe position, and this position will be automatically transmitted in the form of an electrical signal to a remotely located position monitoring facility. When this occurs, it is obvious that repair of the valve or valve operator assembly is necessary. In the event the gate fails to move or only moves partially between its open and closed positions, the monitoring facility will reflect this condition and steps may be taken to alleviate this condition. The signal indicating mechanism disclosed herewith, utilizes inexpensive and reliable reed switch apparatus which is controlled by close proximity of permanent magnets for generating electrical signals to indicate the position of the gate member. Such simple and inexpensive structure obviously results in a valve mechanism which is low in cost as well as reliable in use. The reed switch position indicator mechanisms of this invention extend in fixed condition within the pressurized valve chamber of the valve and are protected from the corrosive effects of production fluids and from the damaging effects of fluid pressure by a protective cover mechanism. It is, therefore, evident that our invention is one well adapted to attain all of the objects hereinabove set forth together with other advantages which will become obvious and inherent from a description of the apparatus itself.

We claim:

1. A valve having a valve body defining a valve chamber and having inlet and outlet flow passages in fluid communication with the valve chamber, a valve element within said valve chamber and being movable between open and closed positions thereof for controlling the flow of production fluid through said flow passages, means for imparting movement to said valve element between said open and closed positions, magnetically actuatable switch means being fixed to said valve body and extending into said valve chamber, said switch means including electrical circuitry for transmitting position signals to signal receiving apparatus upon actuation of said switch means, said valve having magnet means connected to said valve element for actuating said switch means responsive to movement of said valve element, whereby desired positions of said valve element will be displayed by said signal receiving apparatus.

2. A valve as set forth in claim 1, said switch means comprising magnetically actuated switches located at each extremity of movement of said valve element and being actuated by said magnet means at each extremity of movement of said valve element.

3. A valve as set forth in claim 1, said valve element comprising a gate member disposed for reciprocal movement within said valve chamber, said magnet means carried by said gate member and being reciprocable corresponding therewith, said magnetically actuatable switch means comprising upper and lower switches carried by said body, said magnet means moving in close proximity with said upper or lower switch at the extremities of reciprocation of said gate member and actuating the adjacent one of said switches upon moving in close proximity therewith.

4. A valve as set forth in claim 3, said gate member having an axial opening therein, said switch means extending into said axial opening as said gate moves to its lowermost position.

5. A valve as set forth in claim 3, said gate member having an axial opening therein, a nonmagnetic magnet carrier being fixed to the lower extremity of said gate member and having an aperture therein for registry with said axial passage, said magnet means comprising a plurality of permanent magnets carried by said magnet carrier and being disposed about said aperture.

6. A valve as set forth in claim 3, said gate member having an axial opening therein, a permanent ring magnet carried at the free extremity of said gate about said axial opening, said switch means passing through said ring magnet as said gate member is moved toward its lowermost position.

7. A valve as set forth in claim 3, a switch carrier element being connected to said valve body and having an axial bore formed therein, upper and lower switches carried by said switch carrier element and being disposed in close proximity with said axial bore, a wand connected to said gate member and extending into said bore, a permanent magnet carried by said wand and being moved by said wand into close proximity with said upper or lower switches for actuation of said switches as said gate is moved to its lower or upper position.

8. A valve as set forth in claim 1, said magnet means including magnets having open magnetic circuits, said valve element being an armature and completing said open magnetic circuits upon moving in close proximity therewith, whereby said completed magnetic circuits cause actuation of said switch means.

9. A gate valve having a valve body defining a valve chamber and having inlet and outlet flow passages disposed in fluid communication with said valve chamber, a gate member disposed within the valve chamber and being reciprocable between open and closed positions to control the flow of fluid through the flow passages, means for imparting reciprocal movement to said gate member, magnetically actuatable switch means including electrical circuitry therefore carried by said valve body and extending into said valve chamber, permanent magnet means carried by said gate within said valve chamber and being movable into close proximity with said switch means at the extremities of gate travel whereby said switch means will be actuated to complete said electrical circuitry and transmit electrical signals to signal receiving apparatus.

10. A gate valve as set forth in claim 9, an axial opening formed in said gate member a pair of nonmagnetic magnet carrier blocks fixed to the lower extremity of said gate, said carrier blocks having central apertures therein for registry with said axial opening in said gate member, said carrier blocks cooperating to retain a plurality of permanent magnets disposed about said central apertures and in close proximity therewith, a nonmagnetic switch protector being connected to said valve body and being received in telescoping relation within the axial opening in said gate member, said switch protector having a central blind passage which is open at its lower extremity, said switch means being received within said blind passage whereby said switch means will be disposed in close proximity with said magnets and will be actuated by said magnets upon reciprocation of said gate member to its open or closed positions.

11. A gate valve as set forth in claim 10, said switch means comprising a tubular reed switch mechanism having upper and lower reed switches each having an individual electrical circuit, therefore, said tubular reed switch mechanism being received within said blind passage whereby said reed switches will be disposed in close proximity to the travel of said magnets as said gate is reciprocated and whereby one of said switches will be actuated by the magnetic field of said magnets at each extremity of movement of said gate member to transmit an electrical signal to said monitoring facility.

12. A gate valve having a valve body defining a valve chamber and having inlet and outlet flow passages disposed in fluid communication with said valve chamber, gate means disposed at least partially within the valve chamber and reciprocating between open and closed positions thereof for controlling the flow of production fluid through said flow passages, means for imparting reciprocal movement to said gate means, magnetically actuatable switch means including electrical circuitry therefore being carried by said valve body and extending into said valve chamber, said switch means including magnet means having open magnetic circuit means for actuating said switch means upon completion of said open magnetic circuit means, said gate means upon moving in close proximity with said magnet means serving as an armature and completing said magnetic circuit means, whereby said switch means are actuated and said electrical circuitry is energized responsive to predetermined movement of said gate means.